Aug. 31, 1943.　　　　W. ERNST　　　　2,328,132

RELIEF VALVE

Filed July 26, 1941

WALTER ERNST, Inventor

Attorneys

Patented Aug. 31, 1943

2,328,132

UNITED STATES PATENT OFFICE 2,328,132

RELIEF VALVE

Walter Ernst, Mount Gilead, Ohio, assignor to The Hydraulic Development Corporation, Inc., Wilmington, Del., a corporation of Delaware Application July 26, 1941, Serial No. 404,219

5 Claims. (Cl. 137—53)

This invention relates to valves and, in particular, to valves which, in response to a predetermined pressure, release an outlet opening to relieve pressure therefrom.

This type of valve, commonly called a relief valve, substantially comprises a cylinder with two ports and a plunger-like valve member acted upon by pressure fluid admitted through one of said ports and continuously urged by a spring into position for closing the other port.

These valves, as heretofore known, have the drawback that when using high pressure and correspondingly strong springs, the valve member vibrates violently at the attainment of the release pressure and "chatters" to such an extent that not infrequently it causes breakage of delicate gauges connected thereto. Furthermore, this jumping of the valve member is rather detrimental to the life of the spring and makes it impossible to stabilize the desired pressure, in other words, pressure variations cannot be avoided with the relief valves heretofore known.

Accordingly, it is an object of the present invention to provide a relief valve which will overcome the above mentioned drawbacks without complicating the valve structure.

It is a further object to provide a pressure relief valve in which the force exerted by a spring upon the valve member is supplemented by fluid pressure.

It is another object to provide a pressure relief valve in which, responsive to the attainment of the pressure for which the valve is set, a portion of the pressure fluid causing actuation of the valve member is conveyed to a spring to support the latter in opposing the actuation of the valve member by the pressure fluid acting thereupon.

Figure 1:
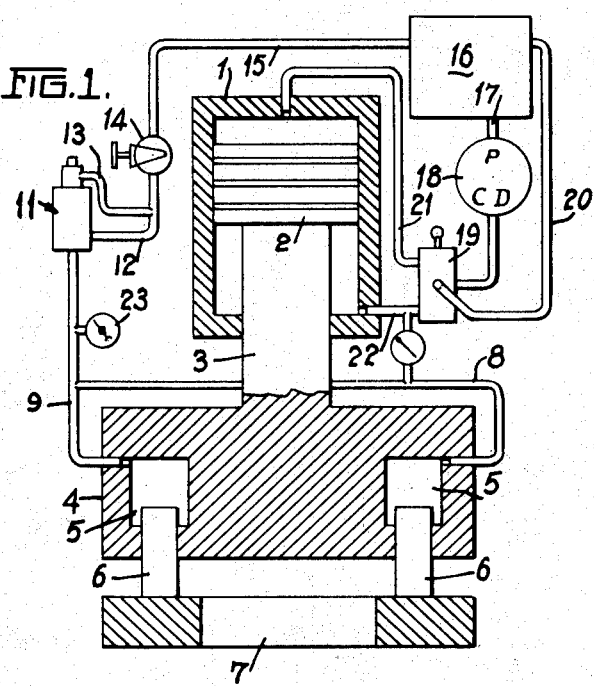

These and other objects and advantages of the invention will appear more clearly from the following specification in connection with the accompanying drawing, in which:

Figure 1 diagrammatically illustrates a hydraulic press circuit in connection with a relief valve according to the invention.

Figure 2:
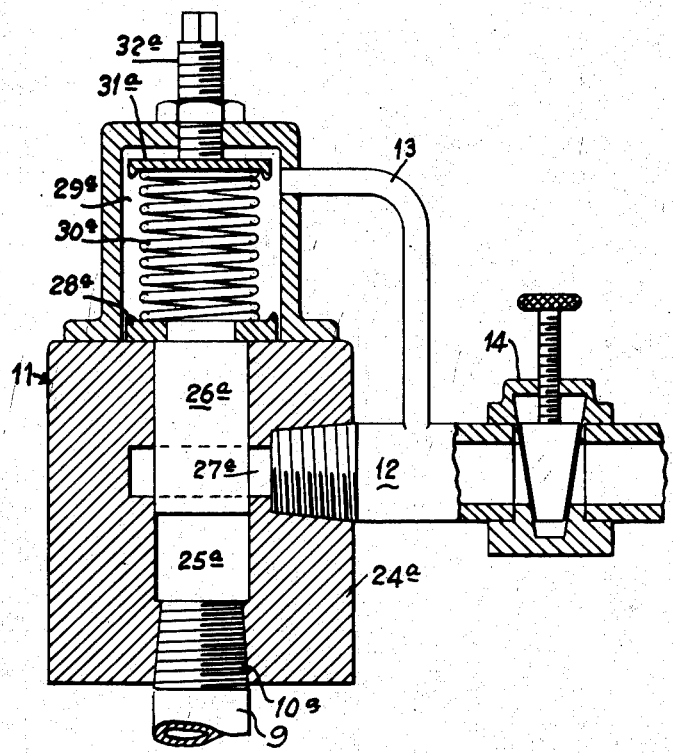

Figure 2 is a section through a relief valve according to the invention.

General arrangement

In general, the valve according to the invention comprises a spring chamber which houses the spring for opposing the movement of the valve member and which communicates with a pressure supply line for supplying pressure into the spring chamber.

This pressure acts somewhat like a shock absorber or stabilizer, thereby enabling a smooth opening of the valve and a stabilization of the valve member in its releasing position when a predetermined pressure has been reached, preventing the pressure from exceeding a predetermined value.

Structural arrangement

Referring now to the drawing in detail, Figure 1 illustrates a hydraulic press circuit in connection with a relief valve according to the invention. The hydraulic circuit of Figure 1 comprises a main cylinder 1 having reciprocably mounted therein a double-acting piston 2 connected by a ram 3 with a platen 4 which in its turn comprises clamping cylinders 5. Reciprocably mounted in the clamping cylinders 5 are clamping plungers 6 connected to a clamping platen 7.

The clamping cylinders 5 communicate with conduits 8 and 9 interconnected with each other and leading to the inlet 10a of the pressure relief valve, generally designated 11.

The vlave 11 shown in Figure 1 communicates through conduits 12 and 13 with the inlet port of an adjustable choke or throttle 14 which in its turn communicates with conduit 15 leading to a fluid reservoir or surge tank 16. The tank 16 is connected with the suction line 17 of a constant delivery pump 18, the pressure side of which communicates with a four-way valve 19, having a fluid connection 20 to the tank 16, a fluid connection 21 to the upper portion of the main cylinder 1, and a fluid connection 22 to the lower portion of the main cylinder 1.

The relief valve 11 is set for a desired pressure in the clamping cylinders 5 and, when the clamping platen 7 at the downward stroke of the ram 3 engages the work piece and, thereby, comes to a halt, while the ram 3 continues its downward movement, pressure builds up in the clamping cylinders 5 which, at the attainment of a predetermined value determined by the setting of the relief valve 11, causes the opening of the relief valve. The clamping pressure in the clamping cylinders 5 may be observed on the gauge 23. The pressure relief valve 11 may be constructed in various forms.

According to Figure 2, the relief valve comprises a casing 24a with the inlet opening 10a adapted to be connected to the pressure line 9 and leading to the cylinder bore 25a having reciprocably mounted therein a valve member 26a which in its turn is adapted to control an outlet port 27a in the casing 24a adapted to be connected with an exhaust.

The upper end of the value member 26a is connected, in any convenient manner, with a disc 28a arranged in a spring chamber 29a provided on top of the casing 24a and housing a spring 30a which continuously urges the valve member 26a into position for closing the outlet port 27a. While the lower end of the spring 30a engages the disc 28a, the upper end of the spring 30a is engaged by a disc 31a which, by means of a screw 32a, may be adjusted so as to vary the thrust of the spring 30a.

The spring chamber 29a has a restricted connection 13 with the exhaust line 12 leading to the adjustable choke or throttle 14.

When, at the inlet port 10a, a predetermined pressure has been obtained for which the relief valve has been set by the adjustment of the screw 32a, the valve member 26a will be lifted so as to release the outlet port 27a. A portion of the pressure fluid will then be conveyed through conduits 12 and 13 into the spring chamber 29a and will there act upon the central portion of the disc 28a to support the action of the spring 30a. In this way the fluid pressure prevailing in the spring chamber 29a acts as shock absorber and stabilizer, and prevents any violent vibrations or chattering of the valve member 26a, thereby stabilizing the valve member in its releasing position.

It will be understood that I desire to comprehend within my invention such modifications as come within the scope of the claims and the invention.

Having thus fully described my invention, what I claim as new and desire to secure by Letters Patent is:

1. A valve having a chamber with an inlet port and an outlet port, an exhaust line connected to said outlet port, a valve member reciprocably mounted in said valve chamber and operable by pressure fluid admitted through said inlet port to release said outlet port, yielding means continuously urging said valve member into position for closing said outlet port, choke means in said exhaust line, and conduit means communicating with said exhaust line at a point between said outlet port and said choke means and adapted to convey pressure fluid to said valve member in a direction to aid said yielding means in its tendency to move said valve member into said closing position.

2. In a hydraulic circuit, a valve casing having a bore with an inlet and an outlet opening, a plunger reciprocably mounted in said bore and normally closing said outlet opening, said plunger being operable to release said outlet opening in response to a predetermined pressure at said inlet opening, a chamber associated with said casing and housing yielding means acting upon said plunger so as to continuously urge the same into position for closing said outlet opening, a low pressure line connected with said chamber and said outlet opening and adapted to convey fluid pressure to said chamber lower than the pressure at said inlet opening for exerting pressure on said plunger in the same direction as said yielding means to aid the action thereof, and means for controlling the pressure at said outlet opening and in said chamber independently of said predetermined pressure adapted to cause said plunger to release said outlet opening.

3. In combination in a valve, a casing having a valve chamber with an inlet port and an outlet port, a valve member reciprocably mounted in said valve chamber and normally being in closing position to thereby prevent fluid connection between said inlet port and said outlet port, said valve member being adapted in response to a predetermined opening pressure at the inlet port to move into opening position for effecting fluid connection between said inlet port and said outlet port, yielding means continuously urging said valve member into position for closing said outlet port, conduit means for conveying fluid pressure from said outlet port to said valve member for aiding the thrust exerted thereupon by said yielding means in its tendency to move said valve member into closing position, and means for selectively varying said last mentioned fluid pressure without changing said predetermined opening pressure.

4. In combination in a valve, a valve casing having a valve bore with an inlet and an outlet opening, a fluid operable plunger reciprocably mounted in said valve bore and operable to control said outlet opening, a chamber connected to said casing and housing a spring acting upon a portion of said plunger extending into said chamber, said spring being arranged for continuously urging said plunger into position for closing said outlet opening, conduit means connected to said outlet opening and comprising a choke, and a hydraulic connection between said chamber and a point of said conduit means, located between said choke and said outlet opening, said connection being adapted, in response to the release of said outlet opening by said plunger, to convey a portion of the pressure fluid, released through said outlet opening, from said conduit means to said chamber, to aid said spring in its tendency to urge said plunger into closing position.

5. In combination in a valve, a valve casing having a chamber with an inlet and an outlet opening, a valve member reciprocably mounted in said chamber and normally closing said outlet opening, said valve member being adapted in response to a predetermined fluid pressure, at said inlet opening to release said outlet opening for releasing pressure fluid therethrough, yielding means operatively connected with said valve member for urging said valve member into position for closing said outlet opening, said yielding means being arranged in a chamber forming a part of said valve casing, conduit means continuously establishing fluid connection between said outlet opening and said last mentioned chamber and responsive upon movement of said valve member into its releasing position for directing a portion of said pressure fluid to act on said valve member in the same direction as the thrust exerted by said yielding means upon said valve member, to supplement the thrust of said yielding means, and means arranged outside said conduit means for varying the amount of the pressure fluid entering said conduit means without changing said predetermined fluid pressure which causes said valve member to release said outlet opening.

WALTER ERNST.